United States Patent [19]

Takahashi

[11] Patent Number: 4,823,193
[45] Date of Patent: Apr. 18, 1989

[54] DATA COMMUNICATION APPARATUS

[75] Inventor: Masatomo Takahashi, Tokyo, Japan

[73] Assignee: Canon Kabushiki Kaisha, Tokyo, Japan

[21] Appl. No.: 906,802

[22] Filed: Sep. 12, 1986

[30] Foreign Application Priority Data

Sep. 19, 1985 [JP] Japan .................................. 60-205423

[51] Int. Cl.$^4$ ............................................... H04N 1/32
[52] U.S. Cl. ..................................... 358/257; 358/293; 358/280
[58] Field of Search ................ 358/256, 257, 293, 280

[56] References Cited

U.S. PATENT DOCUMENTS 4,300,169 11/1981 Sato ..................................... 358/256
4,419,697 12/1983 Wada .................................. 358/257

*Primary Examiner*—Edward L. Coles, Sr.
*Attorney, Agent, or Firm*—Fitzpatrick, Cella, Harper & Scinto

[57] ABSTRACT

A data communication apparatus includes: a memory for storing communication data; a reading unit for reading part of the communication data stored in the memory; a generator for generating information relating to the communication data; and a recording unit for recording part of the communication data and the information.

30 Claims, 2 Drawing Sheets (b)

(a)

DATA COMMUNICATION APPARATUS

BACKGROUND OF THE INVENTION

1. Field of the Invention

The present invention relates to a data communication apparatus for sending and receiving image data, character code data and the like, and more particularly to a data communication apparatus having a memory for storing data and capable of, for example, broadcasting transmission.

2. Related Background Art

A conventional communication apparatus such as a facsimile can not conduct a broadcasting transmission because it transmits data at the same time it reads an original.

However, such an apparatus now has a memory in which image data obtained by reading an original is stored, so that a so-called broadcasting function of sequentially and automatically sending the same data to a plurality of destinations, is possible. Thus, for a facsimile having a memory of large capacity, it is possible to store a large amount of image data and carry out a broadcasting transmission at a desired time.

With such an apparatus, it is not possible however to confirm whether image data has actually been accumulated in the memory and the operator must leave this matter to the performance reliability of the apparatus. Furthermore, date and destination information the date and destination, for example can not be obtained from the accumulated image data. Even if the accumulated image data can be reviewed, the reviewed data is merely printed characters which are quite different from the original image data. These problems are also encountered in transmitting other data such as character code data.

SUMMARY OF THE INVENTION

It is an object of the present invention to provide a data communication apparatus eliminating the above-described related art disadvantages.

According to an embodiment of the present invention, there is provided a data communication apparatus capable of reading management information on the communication data stored in a memory as well as part of the communication data and of recording both of them on a recording paper.

Other objects will become apparent from the following detailed description of the invention with reference to the accompanying drawings.

DESCRIPTION OF THE PREFERRED EMBODIMENT

The present invention will now be described in detail with reference to the accompanying drawings.

Figure 1:
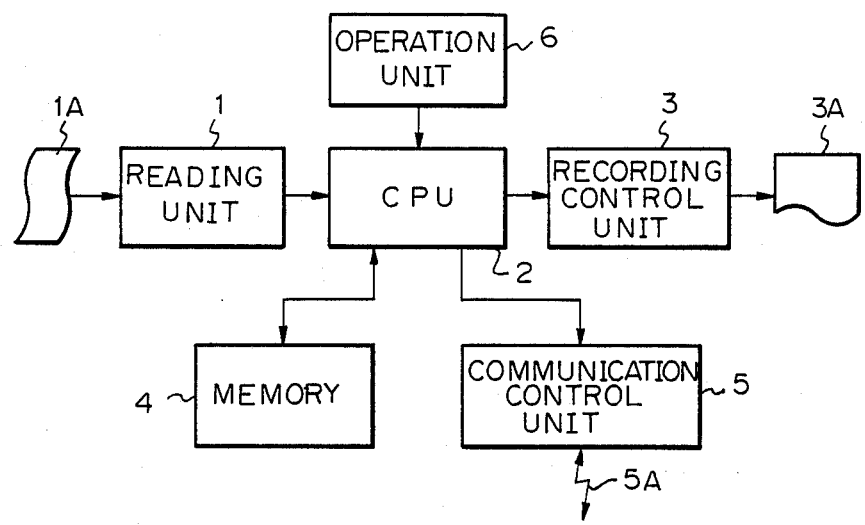
FIG. 1 is a block diagram of a data communication apparatus according to an embodiment of the present invention.

FIG. 1 shows an example of an image data communication apparatus embodying the present invention.

In the figure, a reading (control) unit 1 reads an original 1A and obtains image data of the original. A central processing unit 2 controls the entire system of the apparatus and is comprised, for example, of a microprocessor. A recording control unit 3 prints an image of received image data or the like on a recording paper 3A. A memory 4 stores image data or the like obtained from the reading unit 1. A communication control unit 5 controls communication over a communication line 5A. An operation unit 6 is used for input of various commands by an operator.

The central processing unit 2 shown in FIG. 1 has a timer function and a character generator. The timer function is used when requesting the accumulation time and the like to be described later.

An example of the operation of the apparatus of FIG. 1 will be described with reference to FIGS. 2 and 3.

The operation start time is first read from the timer and is stored at step S1. Next, in accordance with the original reading mode (standard/fine, half-tone, density and so on) instructed by the operator through the operation unit 6, the original is read by the reading unit 1 and the read data is accumulated in the memory 4 at step S2. After completing the accumulation of the read data of the original at step S3, step S4 follows.

At step S4, the reading unit 1 sends the read image data to the central processing unit 2 to add thereto management information on the image data, such as the reading mode, the accumulated data and the like. The read image data and the management information are accumulated in the memory 4. Next, at step S5, the management information is read out from the memory 4 so that the management can be printed by means of the recording control unit 3 as shown in (b) of FIG. 2. At step S6, after reading the management information, the image data is read out from the memory 4 so that the image data is printed by means of the recording control unit 3 as shown in FIG. 2.

Figure 2:
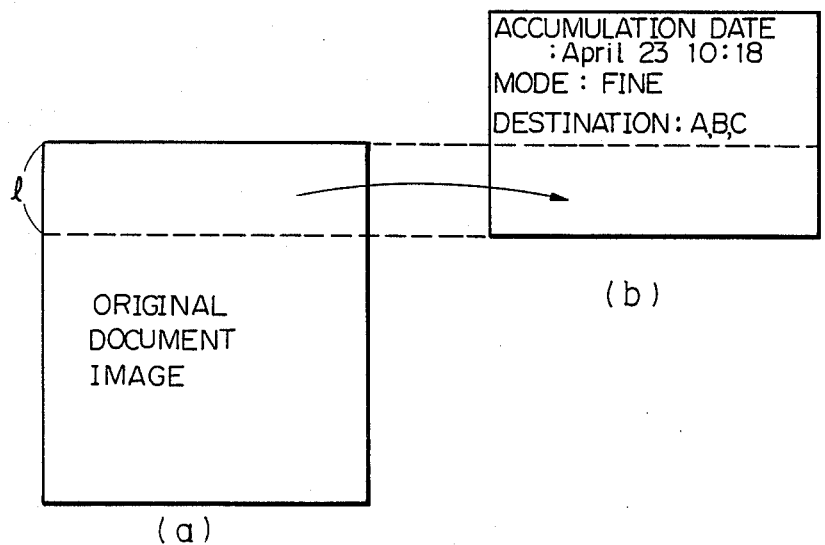
FIG. 2 is a view showing an example of printed papers obtained using the apparatus.
Figure 3:
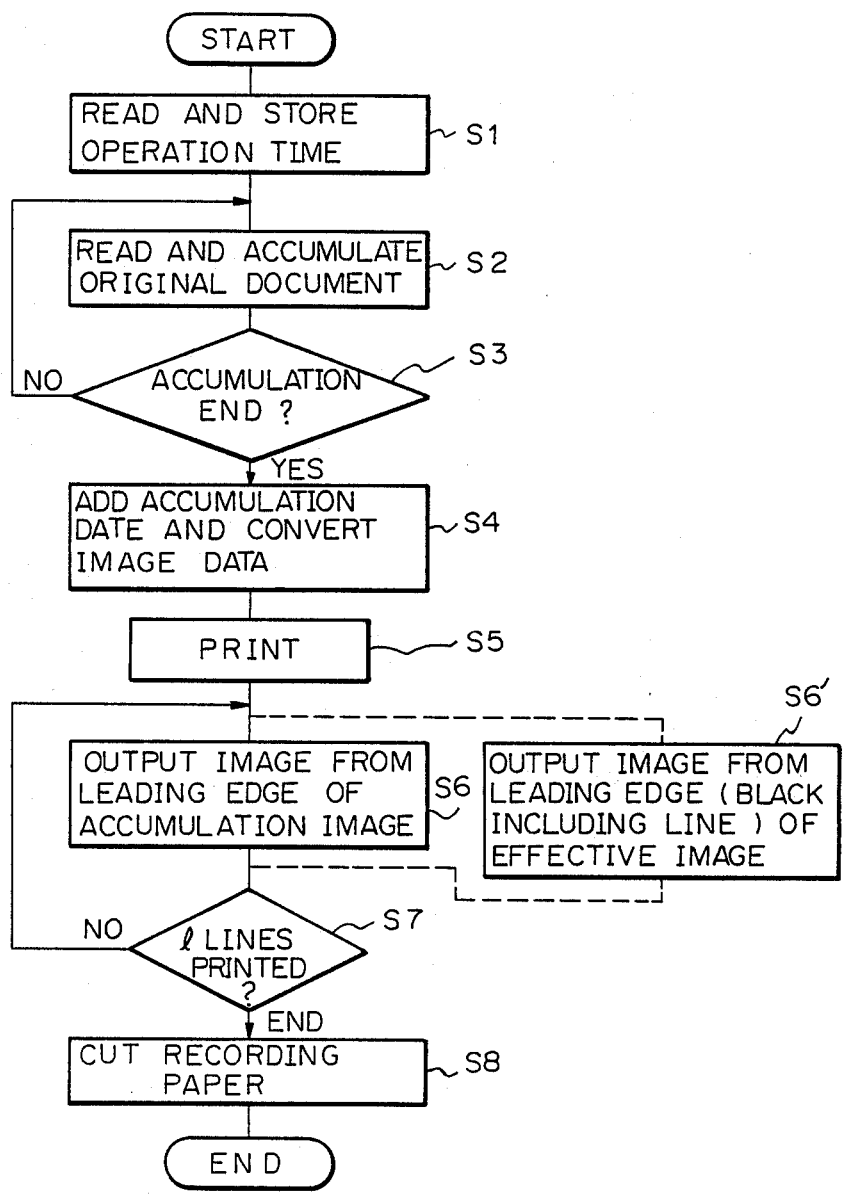
FIG. 3 is a flow chart illustrating the operation of the apparatus.

After judging at step S7 that part of the image data, i.e., 1 lines have been printed, the recording paper is cut at step S7 to obtain a receipt of a printed report for confirmation of the image data accumulation as shown in (b) of FIG. 2.

A similar receipt format is also used for printing a receipt of other previously accumulated image data so that inquiry of the previously accumulated image data can be quickly made.

As can be appreciated from the above-described embodiment, the apparatus enables obtaining not only a printed character receipt but also part of the image data added thereto. Therefore, the image data itself can be referred to thereby confirming that the image data has actually been accumulated in the memory.

In the above embodiment, the image data printed on the receipt has been limited to 1 lines from the leading edge of the original. However, since the leading portion of an original is usually blank, it is preferable, as shown at step S6', to print 1 lines starting from the first line which contains black data of the effective image on the receipt so that the inquiry about the image data can be effectively made.

The apparatus may be constructed in such a way that the image to be printed on the receipt is designated by the operator to any desired portion of an original, such as the middle or end portion instead of the leading portion.

The present invention is applicable to a character code communication apparatus by converting character codes into font codes using a character generator.

As described so far, since a receipt printed with not only the management information such as the reading mode but also part of the accumulated data can be obtained when communication data has been stored in the memory, improvement on the operability, reliability and certainty is assured.

The present invention is not limited to the above embodiment but various applications and modifications are possible within the scope of the appended claims.

What is claimed is:

1. An image data communication apparatus comprising:
    reading means for reading an image of an original document;
    memory means for storing image data read by said reading means;
    transmitting means for transmitting, after storage of the image data in said memory means, the image data stored in said memory means;
    information generating means for generating information relating to a transmitting destination of the stored image data and for generating information relating to the storage time at which said memory means stores the image data;
    readout means for reading out a part of the image data stored in said memory means; and
    recording means for recording, at an image data transmitting side of the apparatus, the part of the image data read out by said readout means, the information relating to the transmitting destination obtained by said information generating means, and the information relating to the storage time obtained by said information generating means.

2. An image data communication apparatus according to claim 1, wherein said information generating means further generates information relating to a transmitting mode of the apparatus, and wherein said recording means records the information relating to the transmitting mode.

3. An image data communication apparatus according to claim 1, wherein said readout means reads a part of the leading portion of the data in said memory means.

4. An image data communication apparatus according to claim 1, wherein said readout means reads a part of the effective leading portion of the data in said memory means.

5. A data communication apparatus according to claim 1, wherein said recording means records after the data has been stored in said memory means.

6. An image data communication apparatus according to claim 1, wherein the part of the image data read out by the readout means, the information relating to the transmitting destination, and the information relating to the storage time are all recorded on a single sheet of recording paper.

7. An image data communication apparatus comprising:
    a memory for storing transmission image data;
    transmission means for transmitting the data in said memory in the form of a transmission image signal;
    reading means for reading a part of the data in said memory;
    generating means for generating information including information relating to the accumulation time at which said memory stores the transmission image signal;
    receiving means for receiving image data;
    recording means for recording the image data received by said receiving means; and
    control means for controlling said recording means, said reading means, and said generating means such that, after storage of the image data in said memory, the part of the stored image data and the information relating to the accumulation time are recorded.

8. An image data communication apparatus according to claim 7, wherein the information further includes information relating to a destination.

9. An image data communication apparatus according to claim 7, wherein the information further includes information relating to a communication mode.

10. An image data communication apparatus according to claim 7, wherein said reading means reads a part of the leading portion image data in said memory.

11. An image data communication apparatus according to claim 7, wherein said reading means reads a part of the effective leading portion image data in said memory.

12. An image data communication apparatus according to claim 7, wherein the part of the stored image data and the information relating to the accumulation time are all recorded on a single sheet of recording paper.

13. An image data communication system comprising:
    read means for reading an image of an original document;
    memory means for storing therein image data read by said read means;
    transmission means for transmitting, after storage of the image data in said memory means, the image data stored in said memory means;
    first information generation means for generating information relating to a transmitting destination of the stored image data;
    readout means for reading out a part of the image data stored in said memory means;
    output means for outputting the part of the image data read out by said readout means and the information relating to the transmitting destination obtained by said first information generation means, as a visual image at an image data transmission side; and
    second information generation means for generating information relating to the time at which said memory means stores the image data,
    wherein said output means outputs the information relating to the time at which said memory means stores the image data.

14. An image data communication system according to claim 13, wherein said first information generation means further generates information relating to a transmitting mode, and said output means outputs the information relating to the transmitting mode.

15. An image data communication system according to claim 13, wherein said readout means reads a part of a leading portion of the data in said memory means.

16. An image data communication system according to claim 13, wherein said output means performs outputting after the data has been stored in said memory means.

17. An image data communication system comprising:
    read means for reading an image of an original document;

memory means for storing image data read by said read means;

transmission means for transmitting, after storage of the image data in said memory means, the image data stored in said memory means;

information generation means for generating information relating to a transmitting destination of the stored image data;

readout means for reading out a part of the image data stored in said memory means; and output means for outputting the part of the image data read out by said readout means and the information relating to the transmitting destination obtained by said information generation means, as a visual data at an image data transmission side, wherein said information generation means further generates information relating to a transmitting mode, and said output means outputs the information relating to the transmitting mode.

18. An image data communication system according to claim 17, further comprising second information generation means for generating information relating to the time at which said memory means stores the image data, and wherein said output means outputs the information relating to the time at which said memory stores the image data.

19. An image data communication system according to claim 17, wherein said readout means reads a part of a leading portion of the data in said memory means.

20. An image data communication system according to claim 17, wherein said output means performs outputting after the data has been stored in said memory means.

21. An image data communication apparatus comprising:

read means for reading an image of an original document;

memory means for storing therein image data read by said read means;

transmission means for transmitting, after storage of the image data in said memory means, the image data stored in said memory means;

information generation means for generating information relating to a transmitting destination of the stored image data;

readout means for reading out a part of the image data stored in said memory means; and record means for recording on a recording paper, at an image data transmission side of the apparatus, the part of the image data read out by said readout means and the information relating to the transmitting destination obtained by said information generation means, wherein said information generation means further generates information relating to a transmitting mode of the apparatus, and said record means records the information relating to the transmitting mode.

22. An image data communication apparatus according to claim 21, further comprising second information generation means for generating information relating to the time at which said memory means stores the image data, and wherein said record means records on the recording paper the information relating to the time at which said memory means stores the image data.

23. An image data communication apparatus according to claim 21, wherein said readout means reads a part of a leading portion of the data in said memory means.

24. An image data communication apparatus according to claim 21, wherein said readout means reads a part of an effective leading portion of the data in said memory means.

25. An image data communication apparatus according to claim 21, wherein communication data is image data.

26. An image data communication apparatus comprising:

a memory for storing therein transmission image data;

transmission means for transmitting the data in said memory in the form of a transmission image signal;

read means for reading a part of the data in said memory;

generation means for generating information relating to the transmission image signal;

reception means for receiving image data;

record means for recording the image data received by said reception means; and control means for controlling said record means, said read means and said generation means such that, after storage of the image data in said memory, the part of the stored image data and the information relating to the communication mode are recorded on a recording paper, wherein the information includes information relating to a communication mode.

27. An image data communication apparatus according to claim 26, wherein the information includes information relating to an accumulation time in said memory.

28. An image data communication apparatus according to claim 26, wherein the information includes information relating to a destination.

29. An image data communication apparatus according to claim 26, wherein said read means reads a part of the leading portion image data in said memory.

30. An image data communication apparatus according to claim 26, wherein said read means reads a part of the effective leading portion of image data in said memory.

* * * * *

UNITED STATES PATENT AND TRADEMARK OFFICE
CERTIFICATE OF CORRECTION

PATENT NO. : 4,823,193
DATED : April 18, 1989
INVENTOR(S) : MASATOMO TAKAHASHI - Page 1 of 3

It is certified that error appears in the above-identified patent and that said Letters Patent is hereby corrected as shown below:

COLUMN 1

Line 29, "information" should read --information,--.
    Line 30, "example" should read --example,--.

COLUMN 2

Line 31, "management" should read --management information--.
    Line 40, "of" should read --or--.
    Line 45, "inquiry" should read --review--.

COLUMN 3

Line 48, "A data communication apparatus" should read --An image data communication apparatus--.

UNITED STATES PATENT AND TRADEMARK OFFICE
CERTIFICATE OF CORRECTION

PATENT NO. : 4,823,193
DATED : April 18, 1989
INVENTOR(S) : MASATOMO TAKAHASHI          Page 2 of 3

It is certified that error appears in the above-identified patent and that said Letters Patent is hereby corrected as shown below:

COLUMN 6

Lines 18-20, Claim 25 should be deleted.
Lines 21-40, Claim 26 should read as follows:

--26. An image data communication apparatus comprising:

a memory for storing therein transmission image data;

transmission means for transmitting the data in said memory in the form of a transmission image signal;

read means for reading a part of the data in said memory;

generation means for generating information relating to the transmission image signal, the information including information relating to a communication mode;

reception means for receiving image data;

record means for recording the image data received by said reception means; and

UNITED STATES PATENT AND TRADEMARK OFFICE
CERTIFICATE OF CORRECTION

PATENT NO. : 4,823,193
DATED : April 18, 1989
INVENTOR(S) : MASATOMO TAKAHASHI            Page 3 of 3

It is certified that error appears in the above-identified patent and that said Letters Patent is hereby corrected as shown below:

control means for controlling said record means, said read means and said generation means such that, after storage of the image data in said memory, the part of the stored image data and the information relating to the communication mode are recorded on a recording paper.--.

Signed and Sealed this

Twenty-sixth Day of December, 1989

Attest:

JEFFREY M. SAMUELS

*Attesting Officer*      *Acting Commissioner of Patents and Trademarks*